(12) United States Patent
Lee et al.

(10) Patent No.: US 7,885,349 B2
(45) Date of Patent: Feb. 8, 2011

(54) DATA TRANSMITTING AND RECEIVING METHOD USING PHASE SHIFT BASED PRECODING AND TRANSCEIVER SUPPORTING THE SAME

(75) Inventors: Moon Il Lee, Anyang-si (KR); Bin Chul Ihm, Anyang-si (KR); Jin Young Chun, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/565,678

(22) Filed: Sep. 23, 2009

(65) Prior Publication Data

US 2010/0014608 A1    Jan. 21, 2010

Related U.S. Application Data

(63) Continuation of application No. 12/030,125, filed on Feb. 12, 2008.

(60) Provisional application No. 60/889,891, filed on Feb. 14, 2007, provisional application No. 60/894,665, filed on Mar. 13, 2007, provisional application No. 61/021,621, filed on Jan. 16, 2008, provisional application No. 61/023,437, filed on Jan. 25, 2008.

(30) Foreign Application Priority Data

| Apr. 16, 2007 | (KR) | .................... | 10-2007-0037008 |
|---|---|---|---|
| May 2, 2007 | (KR) | .................... | 10-2007-0042717 |
| May 28, 2007 | (KR) | .................... | 10-2007-0051579 |
| Sep. 19, 2007 | (KR) | .................... | 10-2007-0095279 |

(51) Int. Cl.
    *H04B 7/02*    (2006.01)

(52) U.S. Cl. .................... 375/267; 375/262; 375/260; 375/299; 370/210; 370/335

(58) Field of Classification Search ................. 375/267, 375/299, 260, 262, 316; 370/210, 335
See application file for complete search history.

(56) References Cited

U.S. PATENT DOCUMENTS 6,298,092 B1    10/2001    Heath et al.

(Continued)

FOREIGN PATENT DOCUMENTS

EP    1538772    6/2005

(Continued)

OTHER PUBLICATIONS

Berder et al. "Optimal Minimum Distance Based Precoder for MIMO Spatial Multiplexing System" IEEE Transactions on signal processing, vol. 52, pp. 617-627, Mar. 1, 2004.

(Continued)

*Primary Examiner*—Eva Y Puente
(74) *Attorney, Agent, or Firm*—Lee, Hong, Degerman, Kang & Waimey

(57) ABSTRACT

A method for performing a precoding based on a generalized phase shift or a precoding based on an extended phase shift in a Multi-Input Multi-Output (MIMO) system employing several sub-carriers, and a transceiver for supporting the same are disclosed. A phase-shift-based precoding matrix is generalized by multiplying a diagonal matrix for a phase shift by a unitary matrix for maintaining orthogonality between sub-carriers. In this case, a diagonal matrix part may be extended by multiplying a precoding matrix for removing interference between sub-carriers by a diagonal matrix for a phase shift. By generalization and extension of the phase-shift-based precoding, a transceiver is more simplified, and communication efficiency increases.

15 Claims, 8 Drawing Sheets

U.S. PATENT DOCUMENTS

| | | |
|---|---|---|
| 6,760,882 B1 | 7/2004 | Gesbert et al. |
| 7,583,982 B2 | 9/2009 | Olesen et al. |
| 7,609,613 B2 | 10/2009 | Aghvami et al. |
| 7,620,019 B1 | 11/2009 | Smith et al. |
| 7,636,297 B1 | 12/2009 | Lee et al. |
| 7,702,029 B2 | 4/2010 | Kotecha et al. |
| 2003/0048753 A1 | 3/2003 | Jalali |
| 2004/0192218 A1 | 9/2004 | Oprea |
| 2005/0201307 A1 | 9/2005 | Chae et al. |
| 2005/0281350 A1 | 12/2005 | Chae et al. |
| 2006/0013186 A1 | 1/2006 | Agrawal et al. |
| 2006/0013328 A1 | 1/2006 | Zhang et al. |
| 2006/0039489 A1 | 2/2006 | Ikram et al. |
| 2006/0039500 A1* | 2/2006 | Yun et al. .................. 375/299 |
| 2006/0067277 A1 | 3/2006 | Thomas et al. |
| 2006/0067443 A1 | 3/2006 | Liu et al. |
| 2006/0093062 A1 | 5/2006 | Yun et al. |
| 2006/0098568 A1 | 5/2006 | Oh et al. |
| 2006/0098760 A1* | 5/2006 | Shen et al. .................. 375/299 |
| 2006/0146692 A1 | 7/2006 | Gorokhov et al. |
| 2006/0270360 A1 | 11/2006 | Han et al. |
| 2007/0041457 A1 | 2/2007 | Kadous et al. |
| 2007/0097856 A1 | 5/2007 | Wang et al. |
| 2007/0133707 A1 | 6/2007 | Hwang et al. |
| 2007/0147543 A1 | 6/2007 | Horng et al. |
| 2007/0165738 A1 | 7/2007 | Barriac et al. |
| 2007/0189416 A1 | 8/2007 | Kim et al. |
| 2007/0263746 A1* | 11/2007 | Son ........................... 375/267 |
| 2007/0280373 A1 | 12/2007 | Lee et al. |
| 2007/0291638 A1 | 12/2007 | Chae et al. |
| 2007/0297529 A1 | 12/2007 | Zhou et al. |
| 2008/0063115 A1* | 3/2008 | Varadarajan et al. ........ 375/299 |
| 2008/0069031 A1 | 3/2008 | Zhang et al. |
| 2008/0080637 A1* | 4/2008 | Khan et al. ................. 375/267 |
| 2008/0108310 A1 | 5/2008 | Tong et al. |
| 2008/0198946 A1 | 8/2008 | Lee et al. |
| 2008/0205533 A1 | 8/2008 | Lee et al. |
| 2008/0240274 A1 | 10/2008 | Han et al. |
| 2009/0003466 A1 | 1/2009 | Taherzadehboroujeni et al. |
| 2009/0003485 A1* | 1/2009 | Li et al. ...................... 375/299 |
| 2009/0110114 A1* | 4/2009 | Onggosanusi et al. ....... 375/299 |
| 2009/0296844 A1 | 12/2009 | Ihm et al. |
| 2009/0316807 A1 | 12/2009 | Kim et al. |
| 2010/0027696 A1* | 2/2010 | Lee et al. .................... 375/260 |
| 2010/0074309 A1 | 3/2010 | Lee et al. |

FOREIGN PATENT DOCUMENTS

| | | |
|---|---|---|
| EP | 1655874 | 5/2006 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 1020070068300 | 6/2007 |
| KR | 10-2008-0036499 | 4/2008 |
| KR | 10-0918747 | 9/2009 |
| RU | 2005-101422 A | 8/2005 |
| RU | 2351071 C2 | 1/2006 |
| TW | 589818 | 6/2004 |
| TW | 200611519 | 4/2006 |
| WO | 2004-038952 A2 | 5/2004 |
| WO | 2004073224 | 8/2004 |
| WO | 2005-122516 | 12/2005 |
| WO | 2005/125044 | 12/2005 |
| WO | 2006002550 | 1/2006 |
| WO | 2006049417 | 5/2006 |
| WO | 2007094832 | 8/2007 |

OTHER PUBLICATIONS

Chang et al. "Asymptotically minimum BER linear block precoders for MMSE equalisation" IEEE proceedings: Communications, vol. 151, nr. 4, pp. 297-304, Jun. 29, 2004.

Athaudage, C.R.N., et al.; "An Efficient Framework to Exploit Frequency Diversity in OFDM: Precoding With Adaptive Subcarrier Selection", The 17th Annual IEEE Int'l Symposium on Personal, Indoor, Mobile Radio Communications; Sep. 11, 2006.

NTT Docomo, 'Multi-Degree Cyclic Delay Diversity with Frequency-Domain Channel Dependent Scheduling', R1-062107, 3GPP TSG RAN WG1 Meeting #46, Aug. 28, 2006.

Samsung, Further details on adaptive cyclic delay diversity scheme, R1-051046, 3GPP TSG RAN WG1 Meeting #42bis, Oct. 10, 2005.

Samsung, 'System performance of adaptive cyclic delay diversity scheme', R1-051047, 3GPP TSG RAN WG1 Meeting #42bis, Oct. 10, 2005.

NTT Docomo, 'Multi-Degree Cyclic Delay Diversity with Frequency-domain Channel Dependent Scheduling', R1-060991, 3GPP TSG RAN WG1 Meeting #44bis, Mar. 26, 2006.

NTT Docomo, 'Channel Dependent Scheduling with Cyclic Delay Diversity', R1-061192, 3GPP TSG RAN WG1 Meeting #45, May 8, 2006.

Ericsson, 'Phase Shift based Precoding for Downlink MIMO Transmission', R1-071032, 3GPP TSG RAN WG1 #48, Feb. 12, 2007.

NTT Docomo, 'CDD-Based Pre-coding Scheme for Rank = 1 and 2', R1-062732, 3GPP TSG RAN WG1 Meeting #46bis, Oct. 9, 2006.

LG Electronics, 'Generalized CDD scheme for E-UTRA downlink MIMO', R1-062314, 3GPP TSG RAN WG1 Meeting #46, Aug. 28, 2006.

LG Electronics, et al., 'CDD-based Precoding for E-UTRA downlink MIMO', R1-063345, 3GPP TSG RAN WG1 Meeting #47, Nov. 6, 2006.

LG Electronics, et al., 'CDD-based Precoding for Open-loop E-UTRA downlink MIMO', R1-063345, 3GPP TSG RAN WG1 Meeting #47, Nov. 6, 2006.

ETRI, 'Combined spatial multiplexing and CSD transmission for rate 2 with 4 transmit antennas', R1-060828, 3GPP TSG RAN WG1 Meeting #44bis, Mar. 27, 2006.

Wang, J., et al.; "Method and Apparatus for Pre-Coding"; U.S. Appl. No. 60/731,301; Oct. 28, 2005.

Bauch et al. "Orthogonal Frequency Division Multiple Access with Cycile Delay Diversity", IEEE, Mar. 2004.

* cited by examiner

DATA TRANSMITTING AND RECEIVING METHOD USING PHASE SHIFT BASED PRECODING AND TRANSCEIVER SUPPORTING THE SAME

CROSS-REFERENCE TO RELATED APPLICATIONS

This application is a continuation of U.S. application Ser. No. 12/030,125, filed Feb. 12, 2008, currently pending. Pursuant to 35 U.S.C. §120, this application claims the benefit of earlier filing date and right of priority to U.S. Provisional Application Ser. No. 60/889,891 filed on Feb. 14, 2007, U.S. Provisional Application Ser. No. 60/894,665 filed on Mar. 13, 2007, U.S. Provisional Application Ser. No. 61/021,621 filed on Jan. 16, 2008 and U.S. Provisional Application Ser. No. 61/023,437 filed on Jan. 25, 2008, the contents of which [[is]] are hereby incorporated by reference herein in their entirety.

Pursuant to 35 U.S.C. §119(a), this application claims the benefit of earlier filing date and right of priority to Korean Patent Application No. 10-2007-0037008, filed on Apr. 16, 2007, Korean Patent Application No. 10-2007-0042717, filed May 2, 2007, Korean Patent Application No. 10-2007-0051579, filed May 28, 2007 and Korean Patent Application No. 10-2007-0095279, filed on Sep. 19, 2007, the contents of which is hereby incorporated by reference herein in their entirety.

TECHNICAL FIELD

The present invention relates to a method for transmitting and receiving data by performing a precoding based on a generalized phase shift in a Multi-Input Multi-Output (MIMO) system using a plurality of sub-carriers, and a transceiver for supporting the same.

BACKGROUND ART

In recent times, with the increasing development of information communication technologies, a variety of multimedia services, and a variety of high-quality services have been developed and introduced to the market, so that demands of wireless communication services are rapidly increasing throughout the world. In order to actively cope with the increasing demands, capacity of a communication system must be increased.

A variety of methods for increasing communication capacity under wireless communication have been considered, for example, a method for searching for a new available frequency band in all frequency bands, and a method for increasing efficiency of limited resources. As representative examples of the latter method, a transceiver includes a plurality of antennas to guarantee an additional space utilizing resources so that a diversity gain is acquired, or MIMO communication technologies for increasing transmission capacity by transmitting data via individual antennas in parallel have been developed by many companies or developers.

Particularly, a Multiple-Input Multiple-Output (MIMO) system based on an Orthogonal Frequency Division Multiplexing (OFDM) from among the MIMO communication technologies will hereinafter be described with reference to FIG. 1.

FIG. 1 is a block diagram illustrating an OFDM system equipped with multiple transmission/reception (Tx/Rx) antennas.

Referring to FIG. 1, in a transmission end, a channel encoder 101 attaches a redundant bit to a Tx data bit to reduce a negative influence of a channel or noise. A mapper 103 converts data bit information into data symbol information. A serial-to-parallel (S/P) converter 105 converts the data symbol into a parallel data symbol so that the parallel data symbol can be loaded on several sub-carriers. A MIMO encoder 107 converts the parallel data symbol into space-time signals.

In a reception end, a MIMO decoder 109, a parallel-to-serial (P/S) converter 111, a demapper 113, and a channel decoder 115 have functions opposite to those of the MIMO encoder 107, the S/P converter 105, the mapper 103, and the channel encoder 101 in the transmission end.

Various techniques are required for a MIMO-OFDM system to enhance data transmission reliability. As a scheme for increasing a spatial diversity gain, there is space-time code (STC), cyclic delay diversity (CDD) or the like. As a scheme for increasing a signal to noise ratio (SNR), there is beamforming (BF), precoding or the like. In this case, the space-time code or the cyclic delay diversity scheme is normally employed to provide robustness for an open-loop system in which feedback information is not available at the transmitting end due to fast time update of the channel. In other hand, the beamforming or the precoding is normally employed in a closed-loop system in order to maximize a signal to noise ratio by using feedback information which includes a spatial channel property.

As a scheme for increasing a spatial diversity gain and a scheme for increasing a signal to noise ratio among the above-mentioned schemes, cyclic delay diversity and precoding are explained in detail as follows.

When a system equipped with multiple Tx antennas transmits OFDM signals, the CDD scheme allows the antennas to transmit the OFDM signals having different delays or amplitudes, so that a reception end can acquire a frequency diversity gain.

FIG. 2 is a block diagram illustrating a transmission end of a MIMO system based on the CDD scheme.

Referring to FIG. 2, an OFDM symbol is distributed to individual antennas via the S/P converter and the MIMO encoder, a Cyclic Prefix (CF) for preventing an interference between channels is attached to the OFDM symbol, and then the resultant OFDM symbol with the CP is transmitted to a reception end. In this case, a data sequence transmitted to a first antenna is applied to the reception end without any change, and the other data sequence transmitted to a second antenna is cyclic-delayed by a predetermined number of samples as compared to the first antenna, so that the cyclic-delayed data sequence is transmitted to the second antenna.

In the meantime, if the CDD scheme is implemented in a frequency domain, a cyclic delay may be denoted by a product (or multiplication) of phase sequences. A detailed description thereof will hereinafter be described with reference to FIG. 3.

FIG. 3 is a block diagram illustrating a transmission end of a MIMO system based on a conventional phase shift diversity (PSD) scheme.

Referring to FIG. 3, different phase sequences (Phase Sequence 1~Phase Sequence M) of individual antennas are multiplied by individual data sequences in a frequency domain, an Inverse Fast Fourier Transform (IFFT) is performed on the multiplied result, and the IFFT-multiplied data is transmitted to a reception end. The above-mentioned method of FIG. 3 is called a phase shift diversity scheme.

In the case of using the phase shift diversity scheme, a flat fading channel may be changed to a frequency-selective channel, a frequency diversity gain may be acquired by a channel encoding process, or a multi-user diversity gain may be acquired by a frequency-selective scheduling process.

In the meantime, if a closed-loop system includes finite feedback information, two precoding schemes may be used, i.e., a codebook-based precoding scheme and a scheme for quantizing channel information and feeding back the quantized channel information. The codebook-based precoding scheme feeds back an index of a precoding matrix, which has been recognized by transmission/reception ends, to the transmission/reception ends, so that it can acquire a SNR gain.

FIG. 4 is a block diagram illustrating the transmission/reception ends of a MIMO system based on the codebook-based precoding.

Referring to FIG. 4, each of the transmission/reception ends has a finite precoding matrix ($P_1 \sim P_L$). The reception end feeds back an optimum precoding matrix index (1) to the transmission end using channel information, and the transmission end applies a precoding matrix corresponding to the feedback index to transmission data ($\chi_1 \sim \chi_{Mt}$). For reference, the following Table 1 shows an exemplary codebook used when feedback information of 3 bits is used in an IEEE 802.16e system equipped with two Tx antennas to support a spatial multiplex rate of 2.

TABLE 1

| Matrix Index (binary) | Column 1 | Column 2 |
|---|---|---|
| 000 | 1<br>0 | 0<br>1 |
| 001 | 0.7940<br>−0.5801 + j0.1818 | −0.5801 − j0.1818<br>−0.7940 |
| 010 | 0.7940<br>0.0579 + j0.6051 | 0.0579 − j0.6051<br>−0.7940 |
| 011 | 0.7941<br>−0.2978 − j0.5298 | −0.2978 + j0.5298<br>−0.7941 |
| 100 | 0.7941<br>0.6038 + j0.0689 | 0.6038 − j0.0689<br>−0.7941 |
| 101 | 0.3289<br>0.6614 + j0.6740 | 0.6614 − j0.6740<br>−0.3289 |
| 110 | 0.5112<br>0.4754 − j0.7160 | 0.4754 + j0.7160<br>−0.5112 |
| 111 | 0.3289<br>−0.8779 − j0.3481 | −0.8779 + j0.3481<br>−0.3289 |

The above-mentioned phase-shift diversity scheme can acquire a frequency-selective diversity gain in an open loop, and can acquire a frequency scheduling gain in a closed loop. Due to these advantages of the phase-shift diversity scheme, many developers are conducting intensive research into the phase-shift diversity scheme. However, the phase-shift diversity scheme has the spatial multiplexing rate of 1, so that it cannot acquire a high transfer rate, And, if a resource allocation is fixed, the phase-shift diversity scheme has difficulty in acquiring the frequency-selective diversity gain and the frequency scheduling gain.

The codebook-based precoding scheme can use a high spatial multiplexing rate simultaneously while requiring a small amount of feedback information (i.e., index information), so that it can effectively transmit data. However, since it must guarantee a stable channel for the feedback information, it is inappropriate for a mobile environment having an abruptly-changed channel and can be available for only a closed-loop system.

DISCLOSURE

Technical Problem

Accordingly, the present invention is directed to a phase-shift-based precoding method and a transceiver for supporting the same that substantially obviate one or more problems due to limitations and disadvantages of the related art.

An object of the present invention is to provide a phase-shift-based precoding method for solving the problems of the phase shift diversity scheme and the precoding scheme, and a method for applying the phase-shift-based precoding scheme in various ways by generalizing or extending a phase-shift-based precoding matrix.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, an aspect of the present invention, there is provided a method for transmitting a data in a Multi-Input Multi-Output (MIMO) system using a plurality of sub-carriers, the method comprising: determining a precoding matrix as a part of a phase-shift-based precoding matrix, determining a first diagonal matrix for a phase shift as a part of the phase-shift-based precoding matrix, determining a unitary matrix as a part of the phase-shift-based precoding matrix and precoding by multiplying the phase-shift-based precoding matrix by a transmission symbol per resource, wherein the phase-shift-based precoding matrix is determined by multiplying the precoding matrix, the first diagonal matrix, and the unitary matrix.

In another aspect of the present invention, there is provided a transceiver for transmitting a data in a Multi-Input Multi-Output (MIMO) system using a plurality of sub-carriers, the transceiver comprising: a precoding-matrix decision module which determines a precoding matrix as a part of a phase-shift-based precoding matrix, determines a first diagonal matrix for a phase shift as a part of the phase-shift-based precoding matrix, determines a unitary matrix as a part of the phase-shift-based precoding matrix, and determines the phase-shift-based precoding matrix by multiplying the precoding matrix, the first diagonal matrix, and the unitary matrix and a precoding module for precoding by multiplying the phase-shift-based precoding matrix by a transmission symbol per resource.

In another aspect of the present invention, there is provided a method for receiving a data in a Multi-Input Multi-Output (MIMO) system using a plurality of sub-carriers, the method comprising: determining a precoding matrix as a part of a phase-shift-based precoding matrix, determining a first diagonal matrix for a phase shift as a part of the phase-shift-based precoding matrix, determining a unitary matrix as a part of the phase-shift-based precoding matrix and decoding a transmission symbol per resource based on the phase-shift-based precoding matrix, wherein the phase-shift-based precoding matrix is determined by multiplying the precoding matrix, the first diagonal matrix, and the unitary matrix.

In another aspect of the present invention, there is provided a method for receiving a data in a Multi-Input Multi-Output (MIMO) system using a plurality of sub-carriers, the method comprising: determining a precoding matrix as a part of a phase-shift-based precoding matrix, determining a first diagonal matrix for a phase shift as a part of the phase-shift-based precoding matrix, determining a unitary matrix as a part of the phase-shift-based precoding matrix and decoding a transmission symbol per resource based on the phase-shift-based precoding matrix, wherein the phase-shift-based precoding matrix is determined by multiplying the precoding matrix, the first diagonal matrix, and the unitary matrix.

The transmitting and receiving methods and transceiver according to above mentioned aspects, the precoding matrix may be selected to be cyclic-repeated in a first codebook according to the resource index (k).

The precoding matrix may be selected to be cyclic-repeated in a first codebook according to the resource index with being repeated by a predetermined unit. The predetermined unit may be determined in consideration of the spatial multiplexing rate.

The precoding matrix may be selected from a part of the first codebook. Or, the precoding matrix is selected from a second codebook comprising a part of the first codebook.

The precoding matrix may be selected from the first codebook on a basis of feedback information received from a reception end. And the feedback information may include a precoding matrix index (PMI) associated with the codebook.

It is to be understood that both the foregoing general description and the following detailed description of the present invention are exemplary and explanatory and are intended to provide further explanation of the invention as claimed.

ADVANTAGEOUS EFFECTS

The present invention provides a phase-shift-based precoding technique for solving the problems of conventional CDD, PSD, and precoding methods, resulting in the implementation of effective communication. Specifically, the phase-shift-based precoding technique is generalized or extended, the design of a transceiver is simplified or the communication efficiency increases.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

First Embodiment

Phase-Shift-Based Precoding Matrix

Figure 5:
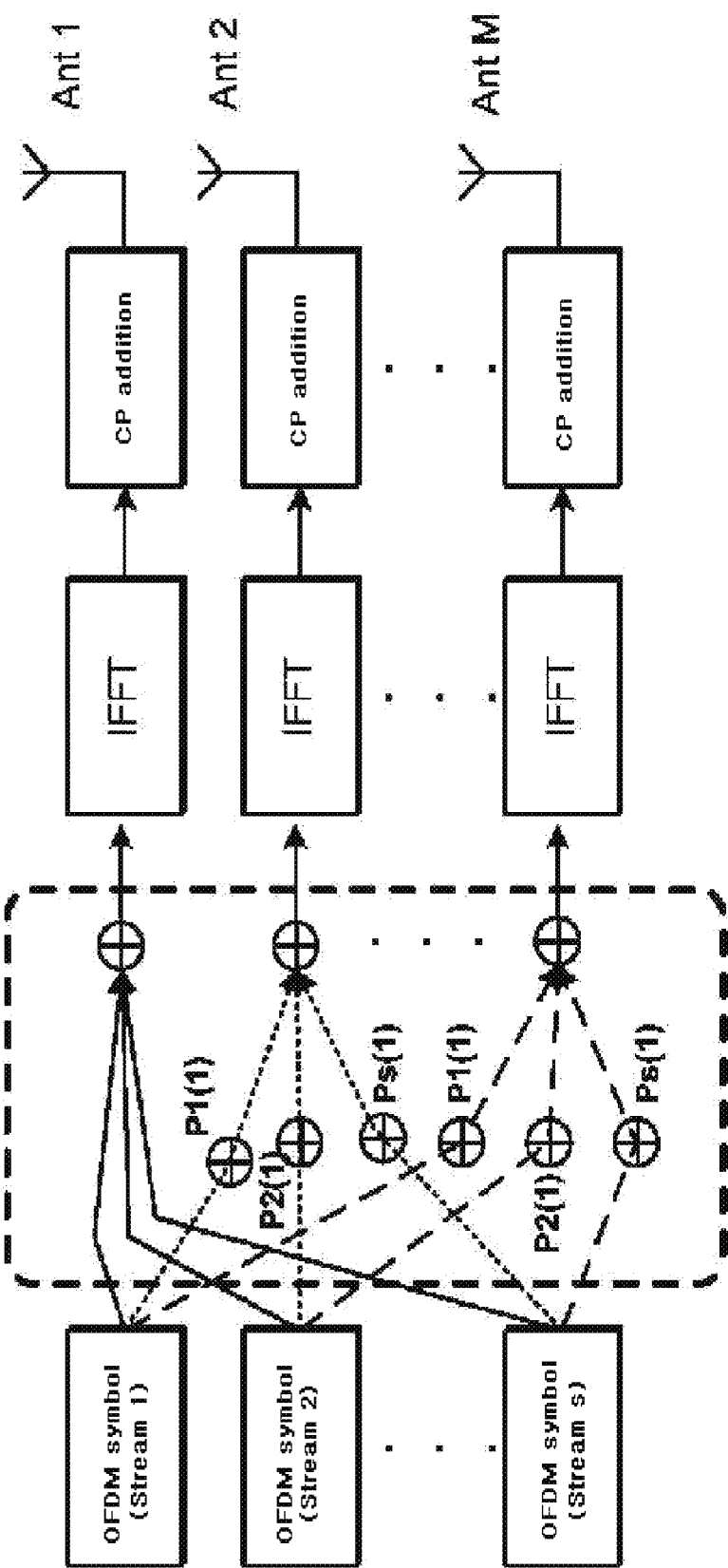
FIG. 5 is a block diagram illustrating the principal components of a transceiver for performing a phase-shift-based precoding scheme according to the present invention.

FIG. 5 is a block diagram illustrating the principal components of a transceiver for performing a phase-shift-based precoding scheme according to the present invention.

The phase-shift-based precoding scheme multiplies sequences having different phases by all streams, and transmits the multiplied streams via all antennas. Generally, from the viewpoint of a receiver, if a phase sequence is generated with a small cyclic delay value, a channel may have a frequency selectivity, and the size of the channel becomes larger or smaller according to parts of a frequency domain.

As can be seen from FIG. 5, a transmitter allocates a user equipment (UE) to a specific part of a frequency band fluctuating with a relatively-small cyclic delay value, so that it acquires a scheduling gain from the specific part in which a frequency increases to implement a stable channel status. In this case, in order to apply a cyclic delay value regularly increasing or decreasing to individual antennas, the transmitter uses the phase-shift-based precoding matrix.

The phase-shift-based precoding matrix (P) can be represented by the following equation 1:

$$p_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 1]}$$

where k is a sub-carrier index or an index of a specific frequency band (k=1, 2, 3, 4, ...) or (k=0, 1, 2, 3, ...), $\theta_i$ (i=1, 2, 3, 4), $w_{i,j}^k$ (i=1, ..., $N_t$, j=1, ..., R) is a complex weight decided by "k", $N_t$ is the number of Tx antennas, and R is a spatial multiplexing rate.

In this case, the complex weight may have different values according to either an OFDM symbol multiplied by antennas or a corresponding sub-carrier index. The complex weight may be determined by at least one of a channel status and the presence or absence of feedback information.

In the meantime, it is preferable that the phase shift based precoding matrix (P) of Equation 1 be configured in the form of a unitary matrix to reduce a loss of channel capacity in a MIMO system. In this case, in order to determine a constituent condition of the unitary matrix, a channel capacity of a MIMO open-loop system can be represented by Equation 2:

$$C_u(H) = \log_2\left(\det\left(I_{N_r} + \frac{SNR}{N_t}HH^H\right)\right) \quad \text{[Equation 2]}$$

Where H is a ($N_r \times N_t$)-sized MIMO channel matrix, and $N_r$ is the number of Rx antennas. If the phase-shift-based precoding matrix P is applied to Equation 2, the following equation 3 is made:

$$C_{precoding} = \log_2\left(\det\left(I_{N_r} + \frac{SNR}{N_t}HPP^HH^H\right)\right) \quad \text{[Equation 3]}$$

As can be seen from Equation 3, in order to prevent the channel capacity from being damaged, $PP^H$ must be an identity matrix, so that the phase-shift-based precoding matrix P must satisfy the following equation 4:

$$PP^H = I_N \quad \text{[Equation 4]}$$

Where $I_N$ is n×n identity matrix.

In order to configure the phase-shift-based precoding matrix P in the form of a unitary matrix, the following two conditions must be simultaneously satisfied, i.e., a power limitation condition and an orthogonal limitation condition. The power limitation condition allows the size of each column of a matrix to be "1", and can be represented by the following equation 5:

$$|w_{1,1}^k|^2 + |w_{2,1}^k|^2 + \ldots + |w_{N_t,1}^k|^2 = 1,$$
$$|w_{1,2}^k|^2 + |w_{2,2}^k|^2 + \ldots + |w_{N_t,2}^k|^2 = 1,$$
$$\vdots$$
$$|w_{1,R}^k|^2 + |w_{2,R}^k|^2 + \ldots + |w_{N_t,R}^k|^2 = 1 \quad \text{[Equation 5]}$$

The orthogonal limitation condition allows individual columns to have orthogonality there between, and can be represented by the following equation 6:

$$w_{1,1}^{k*}w_{1,2}^k + w_{2,1}^{k*}w_{2,2}^k + \ldots + w_{N_t,1}^{k*}w_{N_t,2}^k = 0,$$
$$w_{1,1}^{k*}w_{1,3}^k + w_{2,1}^{k*}w_{2,3}^k + \ldots + w_{N_t,1}^{k*}w_{N_t,3}^k = 0,$$
$$\vdots$$
$$w_{1,1}^{k*}w_{1,R}^k + w_{2,1}^{k*}w_{2,R}^k + \ldots + w_{N_t,1}^{k*}w_{N_t,R}^k = 0 \quad \text{[Equation 6]}$$

Next, a generalized equation of (2×2)-sized phase-shift-based precoding matrix and an equation for satisfying the above-mentioned two conditions will hereinafter be described in detail.

The following equation 7 shows a phase-shift-based precoding matrix which has a spatial multiplexing rate of 2 under 2 Tx antennas:

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix} \quad \text{[Equation 7]}$$

where $\alpha_i$ and $\beta_i$ (i=1, 2) have a real number, $\theta_i$ (i=1, 2, 3, 4) is a phase value, and A is a sub-carrier index of an OFDM symbol. In order to configure the above-mentioned precoding matrix in the form of a unitary matrix, the power limitation condition of the following equation 8 and the orthogonal limitation condition of the following equation 9 must be satisfied:

$$|\alpha_1 e^{jk\theta_1}|^2 + |\beta_2 e^{jk\theta_3}|^2 = 1$$
$$|\alpha_2 e^{jk\theta_4}|^2 + |\beta_1 e^{jk\theta_2}|^2 = 1 \quad \text{[Equation 8]}$$

$$(\alpha_1 e^{jk\theta_1})^* \beta_1 e^{jk\theta_2} + (\beta_2 e^{jk\theta_3})^* \alpha_2 e^{jk\theta_4} = 0 \quad \text{[Equation 9]}$$

where "*" is a conjugate complex number.

An example of the (2×2)-sized phase-shift-based precoding matrix satisfying Equations 8 and 9 is represented by the following equation 10:

$$P_{2\times 2}^k = \frac{1}{\sqrt{2}}\begin{pmatrix} 1 & e^{jk\theta_2} \\ e^{jk\theta_3} & 1 \end{pmatrix} \quad \text{[Equation 10]}$$

where the relationship between $\theta_2$ and $\theta_3$ is represented by the following equation 11:

$$k\theta_3 = -k\theta_2 + \pi \quad \text{[Equation 11]}$$

At least one precoding matrix may be configured in the form of a codebook, so that the codebook-formatted precoding matrix may be stored in a memory of a transmission- or reception-end. The codebook may include a variety of precoding matrixes created by different finite $\theta_2$ values.

In this case, "$\theta_2$" may be properly established by a channel status and the presence or absence of feedback information. If the feedback information is used, "$\theta_2$" is set to a low value. If the feedback information is not in use, "$\theta_2$" is set to a high value. As a result, a high frequency diversity gain is acquired.

In the meantime, a frequency diversity gain or frequency scheduling gain may be acquired according to the size of a delay sample applied to the phase-shift-based precoding.

Figure 6:
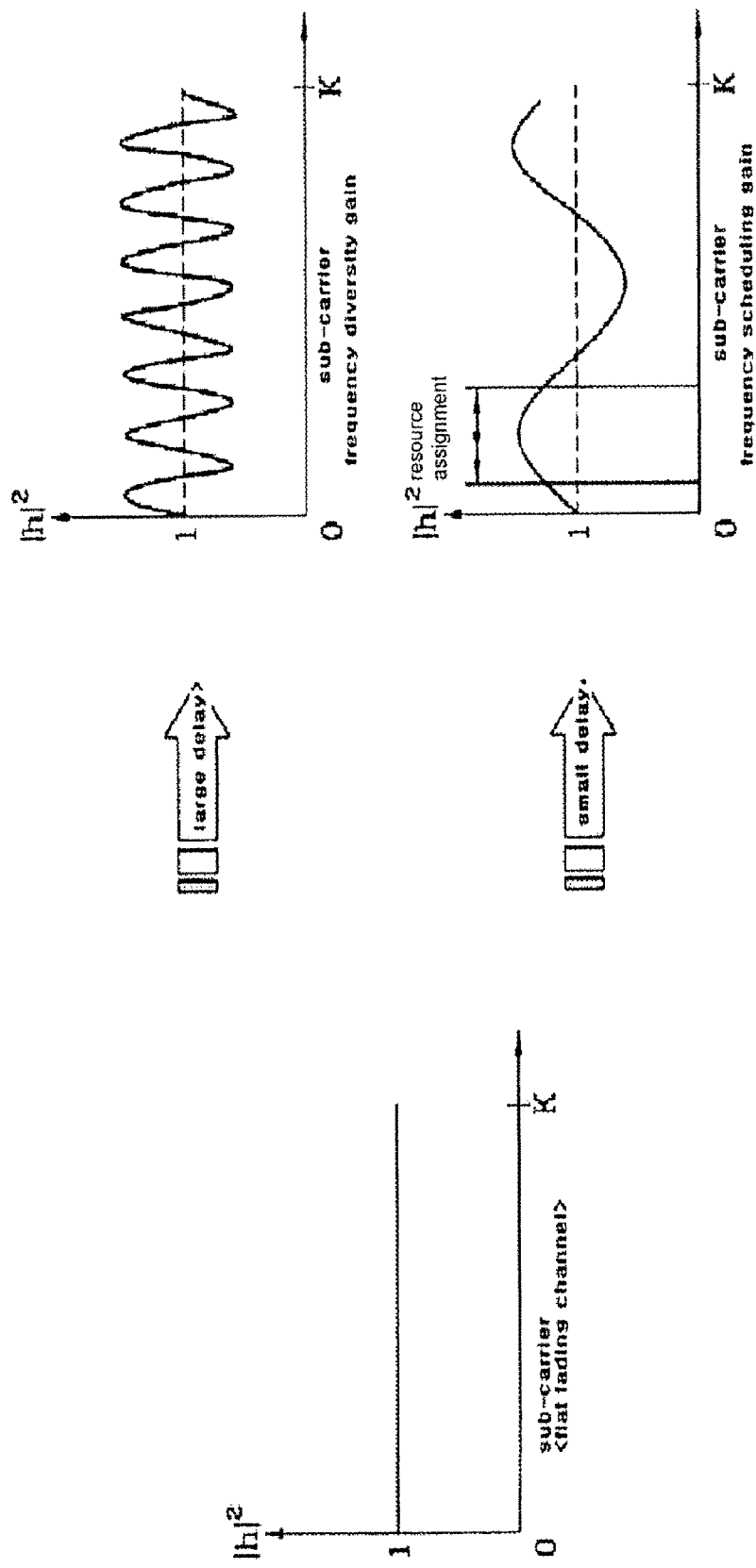
FIG. 6 graphically shows two applications of the phase-shift-based precoding or a phase shift diversity according to the present invention.

FIG. 6 graphically shows two applications of the phase-shift-based precoding or a phase shift diversity according to the present invention.

As can be seen from FIG. 6, if a delay sample (or a cyclic delay) of a large value is used, a frequency-selective period becomes shorter, so that a frequency selectivity increases and a channel code may acquire a frequency diversity gain. So, it is preferable that the large-value delay sample be used for an open-loop system in which the reliability of feedback information deteriorates due to an abrupt channel variation in time.

If a delay sample of a small value is used, a first part in which the channel size becomes larger and a second part in which the channel size becomes smaller occur in a frequency-selective channel changed from a flat-fading channel. Therefore, the channel size becomes larger in a predetermined sub-carrier area of the OFDM signal, and becomes smaller in the other sub-carrier area.

In this case, if at an Orthogonal Frequency Division Multiple Access (OFDMA) system accommodating several users an objective signal is transmitted via a larger-channel-sized frequency band for each user, a Signal-to-Noise Ratio (SNR) can be increased. And, the each user may have different larger-channel-sized frequency bands very often, so that the system can acquire a multi-user diversity scheduling gain. From the viewpoint of a reception end, it can transmit Channel Quality Indicator (CQI) information of only a sub-carrier area to allocate resource as feedback information, so that an amount of the feedback information is relatively reduced.

A delay sample (or cyclic delay) for the phase-shift-based precoding may be predetermined in a transceiver, or may be fed back from a receiver to a transmitter.

Also, the spatial multiplexing rate R may also be predetermined in the transceiver. However, a receiver periodically recognizes a channel status, calculates the spatial multiplexing rate, and feeds back the calculated spatial multiplexing rate to a transmitter. Otherwise, the transmitter may calculate or change the spatial multiplexing rate using channel information fed back from the receiver.

Second Embodiment

Generalized Phase Shift Diversity Matrix

In the case of being used in a system in which the number of antennas is $N_t$ ($N_t$ is a natural number higher than 2) and a spatial multiplexing rate is R, the above-mentioned phase-shift-based precoding matrix can be represented by the following equation 12;

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}^k)$$

[Equation 12]

Equation 12 may be considered to be a generalized format of the conventional phase shift diversity scheme, so that the MIMO scheme shown in Equation 12 will hereinafter be referred to as a Generalized Phase Shift Diversity (GPSD) scheme.

In Equation 12, $GPSD_{N_t \times R}^k$ is a GPSD matrix of a k-th sub-carrier of a MTMO-OFDM signal which has $N_t$ Tx antennas and a spatial multiplexing rate of R. And, $U_{N_t \times R}$ is a unitary matrix (i.e., a second matrix) satisfying $U_{N_t \times R}^H \times U_{N_t \times R} = \mathbb{I}_{R \times R}$, and is adapted to minimize an interference between sub-carrier symbols corresponding to individual antennas. Specifically, in order to maintain a diagonal matrix (i.e., a first matrix) for a phase shift without any change, it is preferable that $U_{N_t \times R}$ may satisfy the condition of the unitary matrix. In Equation 12, a phase angle $\theta_i$ (i=1, ... , $N_t$) of a frequency domain and a delay time $\tau_i$ (i=1, ... , $N_t$) of a time domain have a predetermined relationship, which is represented by the following equation 13:

$$\theta_i = -2\pi/N_{fft} \cdot \tau_i$$ [Equation 13]

where $N_{fft}$ is the number of sub-carriers of an OFDM signal.

A modified example of Equation 12 is shown in the following equation 14, so that the GPSD matrix can be calculated by Equation 14:

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} = (U_{N_t \times R}^k) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix}$$

[Equation 14]

If the GPSD matrix is made by Equation 14, symbols of each data stream (or OFDM sub-carrier) are shifted by the same phase, so that the GPSD matrix can be easily configured. In other words, the GPSD matrix of Equation 14 has columns having the same phase whereas the GPSD matrix of Equation 12 has rows having the same phase, so that the individual sub-carrier symbols are shifted by the same phase. If Equation 14 is extended, the GPSD matrix can be calculated by the following equation 15:

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}^k) \begin{pmatrix} e^{j\theta_1' k} & 0 & \cdots & 0 \\ 0 & e^{j\theta_2' k} & \cdots & 0 \\ \vdots & \vdots & \ddots & 0 \\ 0 & 0 & 0 & e^{j\theta_R' k} \end{pmatrix}$$

[Equation 15]

As can be seen from Equation 15, rows and columns of the GPSD matrix have independent phases, so that a variety of frequency diversity gains can be acquired.

As an example of Equation 12, 14 or 15, a GPSD matrix equation of a system which uses two Tx antennas and a 1-bit codebook can be represented by the following equation 16:

$$GPSD_{2\times 2}^k = \begin{pmatrix} \alpha & \beta \\ \beta & -\alpha \end{pmatrix}, \alpha^2 + \beta^2 = 1 \quad \text{[Equation 16]}$$

In Equation 16, if "α" is decided, "β" is easily decided. So, the value of "α" may be fixed to two proper values, and information associated with the value of "a" may be fed back to a codebook index as necessary. For example, two conditions may be prescribed between a transmitter and a receiver, i.e., one condition in which "α" is set to "0.2" if a feedback index is "0", and the other condition in which "α" is set to "0.8" if a feedback index is "1".

a predetermined precoding matrix for acquiring a SNR gain may be used as an example of the unitary matrix $U_{N_t \times R}$ in Equation 12, 14, or 15. A Walsh Hadamard matrix or a DFT matrix may be used as the above-mentioned precoding matrix. If the Walsh Hadamard matrix is used, an example of the GPSD matrix of Equation 12 can be represented by the following equation 17:

$$GPSD_{4\times 4}^k = \quad \text{[Equation 17]}$$

$$\frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Equation 17 is made on the assumption that a system has 4 Tx antennas and a spatial multiplexing rate of 4. In this case, the second matrix is properly reconstructed, so that a specific Tx antenna is selected (i.e., antenna selection) or the spatial multiplexing rate may be tuned (i.e., rank adaptation).

In the meantime, the unitary matrix $U_{N_t \times R}$ of Equation 12, 14 or 15 may be configured in the form of a codebook, so that the codebook-formatted unitary matrix is stored in a transmission or reception end. In this case, the transmission end receives codebook index information from the reception end, selects a precoding matrix of a corresponding index from its own codebook, and configures a phase-shift-based precoding matrix using Equations 12, 14, or 15.

If a (2×2)- or (4×4)-sized Walsh code is used as the unitary matrix $U_{N_t \times R}$ of Equation 12, 14, or 15, an example of the GPSD matrix is acquired, as represented by the following Tables 2 and 3:

TABLE 2

| 2 Tx | |
|---|---|
| Rate 1 | Rate 2 |
| $\frac{1}{\sqrt{2}}\begin{bmatrix} 1 \\ e^{j\theta_1 k} \end{bmatrix}$ | $\frac{1}{\sqrt{2}}\begin{bmatrix} 1 & 1 \\ e^{j\theta_1 k} & -e^{j\theta_1 k} \end{bmatrix}$ |

TABLE 3

| 4 Tx | | |
|---|---|---|
| Rate 1 | Rate 2 | Rate 4 |
| $\frac{1}{2}\begin{bmatrix} 1 \\ e^{j\theta_1 k} \\ e^{j\theta_2 k} \\ e^{j\theta_3 k} \end{bmatrix}$ | $\frac{1}{2}\begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2}\begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

Third Embodiment

Time-Variant Generalized Phase Shift Diversity

In the GPSD matrix of Equation 12, 14, or 15, a phase angle ($\theta_i$) of a diagonal matrix and/or a unitary matrix (U) may be changed in time. For example, a time-variant GPSD of Equation 12 can be represented by the following equation 18:

$$GPSD_{N_t \times R}^k(t) = \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix} (U_{N_t \times R}(t)) \quad \text{[Equation 18]}$$

where $GPSD_{N_t \times R}^k(t)$ is a GPSD matrix of a k-th sub-carrier of a MIMO-OFDM signal which has $N_t$ Tx antennas and a spatial multiplexing rate of R at a specific time (t). $U_{N_t \times R}(t)$ is a unitary matrix (i.e., a fourth matrix) satisfying $U_{N_t \times R}^H \times U_{N_t \times R} = I_{R \times R}$, and is adapted to minimize an interference between sub-carrier symbols corresponding to individual antennas.

Specifically, in order to maintain characteristics of the unitary matrix of a diagonal matrix (i.e., third matrix) for a phase shift without any change, it is preferable that $U_{N_t \times R}(t)$ may satisfy the condition of the unitary matrix. In Equation 18, a phase angle $\theta_i(t)$ (i=1, . . . , $N_t$) and a delay time $\tau_i(t)$ (i=1, . . . , $N_t$) have a predetermined relationship, which is represented by the following equation 19:

$$\theta_i(t) = -2\pi/N_{fft} \tau_i(t) \quad \text{[Equation 19]}$$

where $N_{fft}$ is the number of sub-carriers of an OFDM signal.

As can be seen from Equations 18 and 19, a time delay sample value and a unitary matrix may be changed in time. In this case, a unitary of the time may be set to an OFDM symbol or a predetermined-unitary time.

If a unitary matrix for acquiring a time-variant GPSD is represented by a GPSD matrix based on the (2×2)-sized Walsh code, the following GPSD matrix can be made as shown in the following Table 4:

TABLE 4

| 2 Tx | |
|---|---|
| Rate 1 | Rate 2 |
| $\begin{bmatrix} 1 \\ e^{j\theta_1(t)k} \end{bmatrix}$ | $\begin{bmatrix} 1 & 1 \\ e^{j\theta_1(t)k} & -e^{j\theta_1(t)k} \end{bmatrix}$ |

If a unitary matrix for acquiring a time-variant GPSD is represented by a GPSD matrix based on the (4×4)-sized Walsh code, the following CPSD matrix can be made as shown in the following Table 5:

TABLE 5

| 4 Tx | | |
|---|---|---|
| Rate 1 | Rate 2 | Rate 4 |
| $\begin{bmatrix} 1 \\ e^{j\theta_1(t)k} \\ e^{j\theta_2(t)k} \\ e^{j\theta_3(t)k} \end{bmatrix}$ | $\begin{bmatrix} 1 & 1 \\ e^{j\theta_1(t)k} & -e^{j\theta_1(t)k} \\ e^{j\theta_2(t)k} & e^{j\theta_2(t)k} \\ e^{j\theta_3(t)k} & -e^{j\theta_3(t)k} \end{bmatrix}$ | $\begin{bmatrix} 1 & 1 & 1 & 1 \\ e^{j\theta_1(t)k} & -e^{j\theta_1(t)k} & e^{j\theta_1(t)k} & -e^{j\theta_1(t)k} \\ e^{j\theta_2(t)k} & e^{j\theta_2(t)k} & -e^{j\theta_2(t)k} & -e^{j\theta_2(t)k} \\ e^{j\theta_3(t)k} & -e^{j\theta_3(t)k} & -e^{j\theta_3(t)k} & e^{j\theta_3(t)k} \end{bmatrix}$ |

Although the above-mentioned third embodiment has disclosed the time-variant GPSD matrix associated with Equation 12, it should be noted that the time-variant GPSD matrix can also be applied to the diagonal matrix and unitary matrix of Equations 14 and 15. Therefore, although the following embodiments will be described with reference to Equation 12, it is obvious to those skilled in the art that the scope of the following embodiments are not limited to Equation 12 and can also be applied to Equations 14 and 15.

Fourth Embodiment

Extension of Generalized Phase Shift Diversity

If a third matrix corresponding to a precoding matrix is added to the GPSD matrix composed of both a diagonal matrix and a unitary matrix, an extended GPSD matrix can be made as shown in the following equation 20:

$$GPSD^k_{N_t \times R} = (\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}) \quad \text{[Equation 20]}$$

Compared with Equation 12, the extended GPSD matrix of Equation 20 further includes a ($N_t$×R)-sized precoding matrix (P) located before a diagonal matrix. Therefore, the size of the diagonal matrix is changed to a (R×R)-size.

The added precoding matrix $\mathbb{P}_{N_t \times R}$ may be differently assigned to a specific frequency band or a specific sub-carrier symbol. Preferably, in the case of an open-loop system, the added precoding matrix $\mathbb{P}_{N_t \times R}$ may be set to a fixed matrix. By the addition of the precoding matrix $\mathbb{P}_{N_t \times R}$, an optimum SNR gain can be acquired.

A transmission end or reception end may have a codebook equipped with a plurality of precoding matrixes (P).

In the meantime, in the extended GPSD matrix, at least one of the precoding matrix (P), the phase angle (θ) of the diagonal matrix, and the unitary matrix (U) may be changed in time. For this purpose, if an index of the next precoding matrix P is fed back in units of a predetermined time or a predetermined sub-carrier, a specific precoding matrix P corresponding to the index may be selected from a predetermined codebook.

The extended GPSD matrix according to the fourth embodiment can be represented by the following equation 21:

$$GPSD^k_{N_t \times R}(t) = \quad \text{[Equation 21]}$$
$$(\mathbb{P}_{N_t \times R}(t)) \begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & \cdots & e^{j\theta_R(t)k} \end{pmatrix} (\mathbb{U}_{R \times R}(t))$$

As an example of the extended GPSD matrix, a matrix equation of a MIMO system which includes two or four Tx antennas is shown in the following equations 22 and 23:

$$GPSD^k_{2 \times 2}(t) = (\mathbb{P}_{2 \times 2}(t)) \begin{pmatrix} 1 & 0 \\ 0 & e^{j\theta(t)k} \end{pmatrix} (DFT_{2 \times 2}) \quad \text{[Equation 22]}$$

$$GPSD^k_{4 \times R}(t) = \quad \text{[Equation 23]}$$
$$(\mathbb{P}_{4 \times R}(t)) \begin{pmatrix} 1 & 0 & \cdots & 0 \\ 0 & e^{j\theta(t)k} & \cdots & 0 \\ \vdots & \vdots & \ddots & \vdots \\ 0 & 0 & \cdots & e^{j(R-1)\theta(t)k} \end{pmatrix} (DFT_{4 \times R})$$

In Equations 22 and 23, although a DFT matrix is used as a unitary matrix, the scope of the present invention is not limited to the DFT matrix, and can also be applied to other matrixes capable of satisfying a given unitary condition such as a Walsh Hadamard code.

As another example of the extended GPSD matrix, a matrix equation of a MIMO system which includes four Tx antennas is shown in the following equation 24:

$$GPSD^k_{N_t \times R}(t) = \underbrace{\begin{pmatrix} e^{j\theta'_1(t)k} & 0 & \cdots & 0 \\ 0 & e^{j\theta'_2(t)k} & \cdots & 0 \\ \vdots & \vdots & \ddots & 0 \\ 0 & 0 & 0 & e^{j\theta'_{N_t}(t)k} \end{pmatrix}}_{D1} \quad \text{[Equation 24]}$$

$$\underbrace{(P_{N_t \times R}(t))\begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_R(t)k} \end{pmatrix}(U_{R \times R})}_{D2}$$

Compared with Equation 12, the extended GPSD matrix of Equation 24 further includes a ($N_t$×$N_t$)-sized diagonal matrix (D1) and a ($N_t$×R)-sized precoding matrix (P), which are located before a diagonal matrix (D2). Therefore, the size of the diagonal matrix (D2) is changed to a (R×R)-size.

The added precoding matrix $\mathbb{P}_{N_t \times R}$ may be differently assigned to a specific frequency band or a specific sub-carrier symbol. Preferably, in the case of an open-loop system, the added precoding matrix $\mathbb{P}_{N_t \times R}$ may be set to a fixed matrix. By the addition of the precoding matrix $\mathbb{P}_{N_t \times R}$, an optimum SNR gain can be acquired.

Preferably, a transmission end or reception end may have a codebook equipped with a plurality of precoding matrixes (P).

In this case, by the diagonal matrixes D1 and D2, a phase angle can be shifted in two ways in a single system. For example, if a low-value phase shift is used by the diagonal matrix D1, a multi-user diversity scheduling gain can be acquired. If a high-value phase shift is used by the diagonal matrix D2, a frequency diversity gain can be acquired. The diagonal matrix D1 is adapted to increase a system performance, and the other diagonal matrix D2 is adapted to average a channel between streams.

And, a high-value phase shift is used by the diagonal matrix D1, so that a frequency diversity gain can increase. A high-value phase shift diversity is used by the diagonal matrix D2, a channel between streams can be averaged. This gain can be acquired from Equation 21.

In this case, the matrix P of Equation 21 must be changed on the basis of a sub-carrier unit or frequency resource unit, and be then used without feedback information. This modified format can be represented by the following equation 25:

$$GPSD_{N_t \times R}^k(t) = (P_{N_t \times R}^k(t)) \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_R(t)k} \end{pmatrix} (U_{R \times R)} \quad \text{[Equation 25]}$$

In Equation 25, $P_{N_t \times R}^k(t)$ is indicative of a specific case, in which individual resource indexes (k) use different precoding matrixes. Thereby, a frequency diversity gain increases by using different precoding matrixes per resource indexes (k), and a channel between streams is averaged by using a diagonal matrix and an identity matrix (U).

Fifth Embodiment

Codebook Subset Limitation Scheme

The codebook subset limitation scheme is to be restricted to use some parts of a codebook. Provided that the number of all precoding matrixes of the codebook is $N_c$, only $N_{restrict}$ precoding matrixes are usable according to the codebook subset limitation scheme. The codebook subset limitation scheme may be used to reduce a multi-cell interference or system complexity. In this case, a predetermined condition denoted by $N_{restrict} \leq N_c$ must be satisfied.

For example, Provided that the number of all precoding matrixes of the codebook is $N_c=6$, a codebook $P_{N_t \times R}$ of all sets and a specific codebook $P_{N_t \times R}^{restrict}$ for allowing only 4 precoding matrixes from among 6 precoding matrixes to be used can be represented by the following equation 26:

$$P_{N_t \times R} = \{P_{N_t \times R}^0, P_{N_t \times R}^1, P_{N_t \times R}^2, P_{N_t \times R}^3, P_{N_t \times R}^4, P_{N_t \times R}^5\},$$

$$P_{N_t \times R}^{restrict} = \{P_{N_t \times R}^0, P_{N_t \times R}^2, P_{N_t \times R}^3, P_{N_t \times R}^5\} = W_{N_t \times R} = \{W_{N_t \times R}^0, W_{N_t \times R}^1, W_{N_t \times R}^2, W_{N_t \times R}^3\} \quad \text{[Equation 26]}$$

In Equation 26, $W_{N_t \times R}$ is an equivalent codebook of the codebook $P_{N_t \times R}^{restrict}$.

Sixth Embodiment

Precoding Matrixes Cyclic Repetition Scheme

For example, if a set of precoding matrixes determined during a Tx/Rx time is pre-defined at a specific time, this case can be represented by the following equation 27:

$$P_{N_t \times R} = \{P_{N_t \times R}^0, P_{N_t \times R}^1, \ldots, P_{N_t \times R}^{N_c-1}\} \quad \text{[Equation 27]}$$

$$GPSD_{N_t \times R}^k = (P_{N_t \times R}^{k \bmod N_t}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (U_{R \times R})$$

In Equation 27, the set of precoding matrixes includes $N_c$ precoding matrixes.

Equation 27 can be simplified in the form of Equation 28:

$$P_{N_t \times R} = \{P_{N_t \times R}^0, P_{N_t \times R}^1, P_{N_t \times R}^{N_c-1}\}$$

$$GPSD_{N_t \times R}^k = (P_{N_t \times R}^{k \bmod N_c}) \Pi_{R \times R}^k \quad \text{[Equation 28]}$$

In Equation 27 and Equation 28, $P_{N_t \times R}^{k \bmod N_c}$ is indicative of a precoding matrix cyclic-repeated according to a sub carrier index or a resource index k among $N_c$ precoding matrixes included in a codebook $P_{N_t \times R}$.

In Equation 28, $\Pi_{R \times R}^k$ is adapted to mix data streams, and may be called a rotation matrix. As can be seen from Equation 28, $\Pi_{R \times R}^k$ may be selected according to a spatial multiplexing rate (R). $\Pi_{R \times R}^k$ may also be easily represented by the following equation 29:

Spatial multiplexing Rate: 2 [Equation 29]

$$\Pi_{2 \times 2}^k = \begin{pmatrix} 0 & 1 \\ 1 & 0 \end{pmatrix}^k \text{ or } \begin{pmatrix} 1 & 0 \\ 0 & e^{j\theta_1 k} \end{pmatrix} DFT_{2 \times 2}$$

Spatial multiplexing Rate: 3

$$\Pi_{3 \times 3}^k = \begin{pmatrix} 0 & 1 & 0 \\ 0 & 0 & 1 \\ 1 & 0 & 0 \end{pmatrix}^k \text{ or } \begin{pmatrix} 1 & 0 & 0 \\ 0 & e^{j\theta_1 k} & 0 \\ 0 & 0 & e^{j\theta_2 k} \end{pmatrix} DFT_{3 \times 3}$$

Spatial multiplexing Rate: 4

$$\Pi_{4 \times 4}^k = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k \text{ or }$$

$$\begin{pmatrix} 1 & 0 & 0 & 0 \\ 0 & e^{j\theta_1 k} & 0 & 0 \\ 0 & 0 & e^{j\theta_2 k} & 0 \\ 0 & 0 & 0 & e^{j\theta_3 k} \end{pmatrix} DFT_{4 \times 4}$$

In addition, in a codebook equipped with $N_c$ precoding matrixes, if a codebook subset limitation scheme capable of using only a specific part of the codebook according to a Node-B or user equipment (UE) is applied to the above-mentioned codebook, $N_c$ precoding matrixes must be reduced to $N_{restrict}$ precoding matrixes, and be then used.

Therefore, in the case of using the equivalent codebook $W_{N_t \times R}$, Equation 28 can be represented by the following equation 30:

$$P_{N_t \times R}^{restrict} = \{P_{N_t \times R}^0, P_{N_t \times R}^2, P_{N_t \times R}^3, P_{N_t \times R}^5\} = W_{N_t \times R} = \{W_{N_t \times R}^0, W_{N_t \times R}^1, W_{N_t \times R}^2, W_{N_t \times R}^3\}$$

$$GPSD_{N_t \times R}^k = (W_{N_t \times R}^{k \bmod N_{restrict}}) \Pi_{R \times R}^k \quad \text{[Equation 30]}$$

where "k" is a sub-carrier index or a frequency-resource index. In Equation 30, $N_{restrict}$ is 4. And in Equation 30, $W_{N_t \times R}^{k \bmod N_{restrict}}$ is indicative of a precoding matrix cyclic-repeated according to a sub carrier index or a resource index k among $N_{restrict}$ precoding matrices included in a codebook $P_{N_t \times R}^{restrict}$ or $W_{N_t \times R}$.

Sixth Embodiment

Precoding Matrixes Cyclic Repetition Scheme by a Predetermined Unit

And, Equation 28 can also be represented by the following equation 31 according to a setup of frequency resources:

$$P_{N_t \times R} = \{P_{N_t \times R}^0, P_{N_t \times R}^1, \ldots, P_{N_t \times R}^{N_c-1}\} \quad \text{[Equation 31]}$$

$$GPSD_{N_t \times R}^k = \left(P_{N_t \times R}^{\left\lceil \frac{k}{v} \right\rceil \bmod N_c}\right) \Pi_{R \times R}^k$$

or $$GPSD_{N_t \times R}^k = \left(P_{N_t \times R}^{\left\lfloor \frac{k}{v} \right\rfloor \bmod N_c}\right) \Pi_{R \times R}^k$$

In Equation 31, "k" may be a sub-carrier index or a virtual-resource index and $GPSD_{N \times R}^k$ can be selected among 2 ways in Equation 31 according to what started index k is.

In Equation 31, if "k" is the sub-carrier index, a precoding matrix is repeated for v sub carriers and the precoding matrix is cyclic-repeated according to a sub carrier index k among $N_c$ precoding matrices included in a codebook $P_{N_t \times R}$.

Exemplary listings of precoding matrix index per sub carrier are as follows:

[1122334455 1122334455 . . . ]

or [000111222333444 000111222333444 . . . ]

The first one represents the case of v=2, $N_c$=5 and k=1, 2, . . . , K, and the second one represents the case of v=3, $N_c$=5, k=0, 1, . . . , K−1. In here, K is a number of resources in a sub-frame.

Equation 31 shows a specific case in which a precoding matrix is differently established in $N_c$ precoding matrixes. The value of v may be decided by considering a spatial multiplexing rate of the precoding matrix. For example, the value of v may be denoted by v=R.

Also, in the case of using the codebook subset limitation scheme of Equations 26, the precoding matrix may also be changed on the basis of a predetermined number of sub-carrier units or a predetermined number of frequency resource units. This format can be represented by the following equation 32:

$$P_{N_t \times R}^{restrict} = \{P_{N_t \times R}^0, P_{N_t \times R}^2, P_{N_t \times R}^3, P_{N_t \times R}^5\} \quad \text{[Equation 32]}$$

$$= W_{N_t \times R}$$

$$= \{W_{N_t \times R}^0, W_{N_t \times R}^1, W_{N_t \times R}^2, W_{N_t \times R}^3\}$$

$$GPSD_{N_t \times R}^k = \left(W_{N_t \times R}^{\left\lceil \frac{k}{v} \right\rceil \bmod N_{restrict}}\right) \Pi_{R \times R}^k$$

or $$GPSD_{N_t \times R}^k = \left(W_{N_t \times R}^{\left\lfloor \frac{k}{v} \right\rfloor \bmod N_{restrict}}\right) \Pi_{R \times R}^k$$

Compared with Equation 31, the precoding matrix of Equation 32 may also be changed by v units. Differently from Equation 31, the precoding matrix of Equation 32 is changed in $N_{restrict}(\leq N_c)$ number of precoding matrixes.

In the meantime, frequency diversity gain could be changed according to the number of cyclic-repeated precoding matrixes or the number of precoding matrixes included in the codebook. Therefore, in case that the codebook subset limitation scheme and precoding matrixes cyclic repetition scheme are adapted in together as represented in Equation 32, various schemes for determining the codebook subset are described as below.

Fifth Embodiment

According to Spatial Multiplexing Rate R

The codebook subset can be determined differently according to the spatial multiplexing rate R. For example, in case of a low spatial multiplexing rate, the size of the codebook subset is determined to be large, such that frequency diversity gain can be achieved up to the maximum. And in case of a high spatial multiplexing rate, the size of the codebook subset is determined to be small, such that the complexity can be decreased with maintaining the performance.

In case of using codebook subset determined according to the spatial multiplexing rate R, the example method can be represented by the following equation 33:

$$W_{N_t \times 2} = \{W_{N_t \times 2}^0, W_{N_t \times 2}^1, W_{N_t \times 2}^2, W_{N_t \times 2}^3\}, \quad \text{[Equation 33]}$$

$$N_{restrict}^2 = 4$$

$$W_{N_t \times 3} = \{W_{N_t \times 3}^0, W_{N_t \times 3}^1, W_{N_t \times 3}^2\}, N_{restrict}^3 = 3$$

$$W_{N_t \times 4} = \{W_{N_t \times 4}^0\}, N_{restrict}^4 = 1$$

$$GPSD_{N_t \times R}^k = \left(W_{N_t \times R}^{\left\lceil \frac{k}{v} \right\rceil \bmod N_{restrict}^R}\right) \Pi_{R \times R}^k$$

or $$GPSD_{N_t \times R}^k = \left(W_{N_t \times R}^{\left\lfloor \frac{k}{v} \right\rfloor \bmod N_{restrict}^R}\right) \Pi_{R \times R}^k$$

Where $N_{restrict}^R$ is denoted by the number of precoding matrixes of codebook subset determined according to the spatial multiplexing rate R. Thereby, in case that precoding matrixes in a codebook adapted by the codebook subset limitation scheme are used by cyclic repeated, a system performance and the system complexity could be improved.

Fifth Embodiment

According to Channel Coding Rate

The codebook subset can be determined differently according to the channel coding rate. For example, generally, frequency diversity gain can be increased when channel coding rate is low. Therefore, in the same spatial multiplexing rate circumstance, codebook subset having different precoding matrixes, preferably precoding matrixes in low channel coding rate can be used, such that a system performance and the system complexity could be improved.

Fifth Embodiment

According to Retransmission

The codebook subset can be determined differently according to retransmission. For example, a codebook subset used at retransmission has precoding matrixes different with precoding matrixes of codebook subset had used at the initial transmission. That is, according to whether to retransmit or the number of retransmission, and so on, differently composed codebook subset can be used. Thereby, the success rate of the retransmission can be increased.

Seventh Embodiment

Extension of Generalized Phase Shift Diversity for Power Control Per Transmission Antenna As to various precoding schemes, different power values per TX antenna can be used in variation of frequency or time. Thereby, system performance may be increased and effective power usage is possible. For example, power control per Tx antenna is able to be used with the precoding schemes of Equations 28, 30, 31 and 32.

Especially, the example of Equation 31 using a codebook including $N_c$ precoding matrixes is represented by the following Equations 34:

$$P_{N_t \times R} = \{P^0_{N_t \times R}, P^1_{N_t \times R}, \ldots, P^{N_c-1}_{N_t \times R}\}, \quad \text{[Equation 34]}$$

$$GPSD^k_{N_t \times R} = D^m_{N_t \times N_t}(t)\left(P^{\lfloor \frac{k}{v} \rfloor mod N_c}_{N_t \times R}\right)\Pi^k_{R \times R},$$

or $$GPSD^k_{N_t \times R} = D^m_{N_t \times N_t}(t)\left(P^{\lfloor \frac{k}{v} \rfloor mod N_c}_{N_t \times R}\right)\Pi^k_{R \times R}$$

$$D^m_{N_t \times N_t}(t) = \begin{pmatrix} a^m_1(t) & 0 & \ldots & 0 \\ 0 & a^m_2(t) & \ldots & 0 \\ \vdots & \vdots & \ddots & 0 \\ 0 & 0 & \ldots & a^m_{N_t}(t) \end{pmatrix}$$

In Equation 34, $\Pi_{R \times R}^k$ is adapted to mix data streams, and may also be called a rotation matrix and, $\Pi_{R \times R}^k$ may also be easily represented by the equation 29. And, $D_{N_t \times N_t}^m(t)$ is denoted by a power control diagonal matrix to enable for each TX antenna to transmit a data stream with different power according to m-th frequency region and/or t-time. $a_{N_t}^m(t)$ is denoted by a power control element used in i-th Tx antenna, m-th frequency region and/or t-time.

The example of Equation 32 using a codebook including $N_{restrict}(\leq N_c)$ precoding matrixes is represented by the following Equations 35:

$$P^{restrict}_{N_t \times R} = \{P^0_{N_t \times R}, P^2_{N_t \times R}, P^3_{N_t \times R}, P^5_{N_t \times R}\} \quad \text{[Equation 35]}$$

$$= W_{N_t \times R}$$

$$= \{W^0_{N_t \times R}, W^1_{N_t \times R}, W^2_{N_t \times R}, W^3_{N_t \times R}\}.$$

$$GPSD^k_{N_t \times R} = D^m_{N_t \times N_t}(t)\left(W^{\lfloor \frac{k}{v} \rfloor mod N_{restrict}}_{N_t \times R}\right)\Pi^k_{R \times R}$$

or $$GPSD^k_{N_t \times R} = D^m_{N_t \times N_t}(t)\left(W^{\lfloor \frac{k}{v} \rfloor mod N_{restrict}}_{N_t \times R}\right)\Pi^k_{R \times R}$$

$$D^m_{N_t \times N_t}(t) = \begin{pmatrix} a^m_1(t) & 0 & \ldots & 0 \\ 0 & a^m_2(t) & \ldots & 0 \\ \vdots & \vdots & \ddots & 0 \\ 0 & 0 & \ldots & a^m_{N_t}(t) \end{pmatrix}$$

In Equation 35, each of $\Pi_{R \times R}^k$, $D_{N_t \times N_t}^m$ and $a_{N_t}^m(t)$ represents the same one with Equation 34.

Eighth Embodiment

Transceiver for Performing Phase-Shift-Based Precoding

Generally, a communication system includes a transmitter and a receiver. In this case, the transmitter and the receiver may be considered to be a transceiver. In order to clarify a feedback function, a part for transmitting general data is the transmitter, and the other part for transmitting feedback data to the transmitter is the receiver.

In a downlink, the transmitter may be a part of a Node-B, or the receiver may be a part of a user equipment (UE). In an uplink, the transceiver may be a part of the UE, or the receiver may be a part of the Node-B. The Node-B may include a plurality of receivers and a plurality of transmitters. And, the user equipment (UE) may also include a plurality of receivers and a plurality of transmitters.

Figure 7:
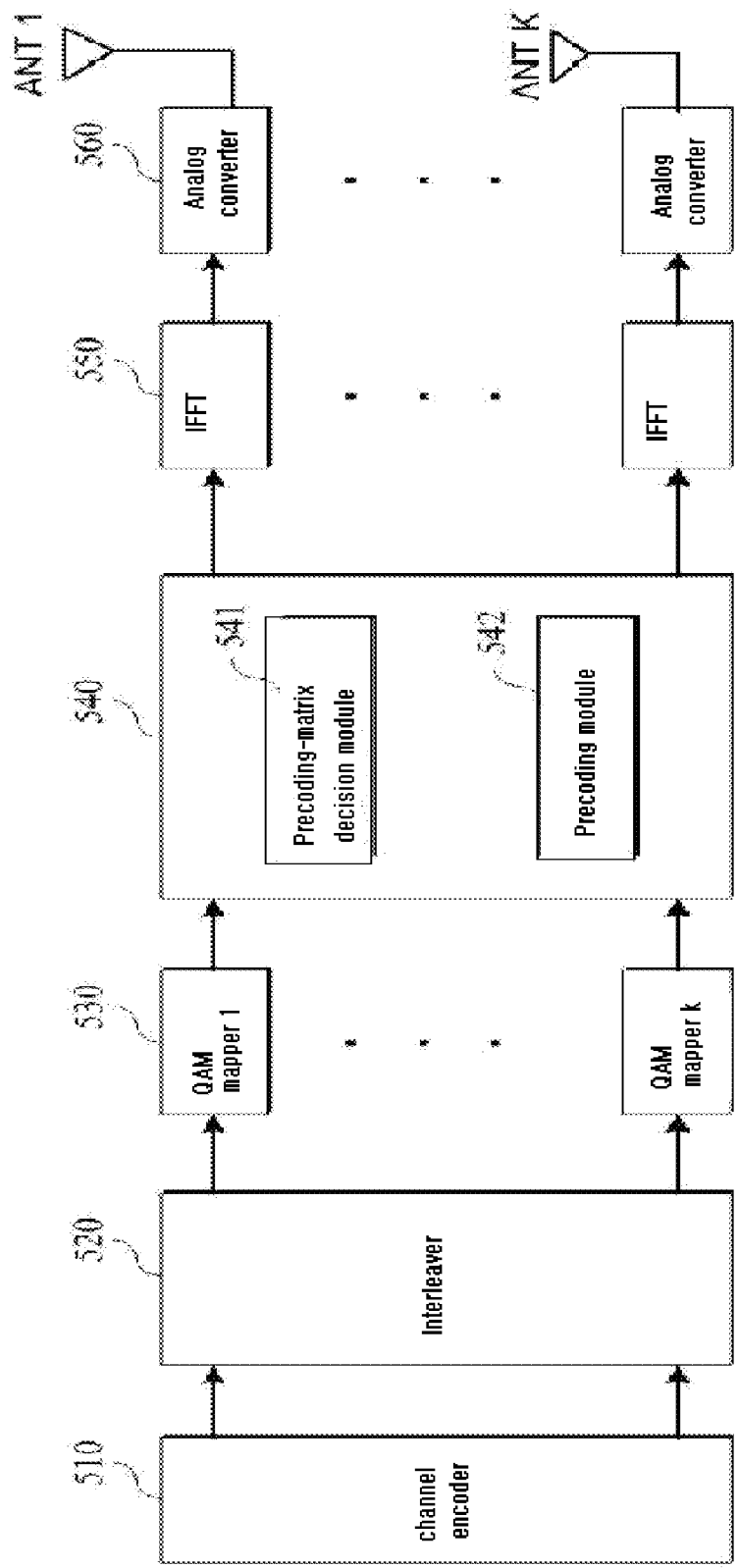
FIG. 7 is a block diagram illustrating a SCW OFDM transmitter based on a phase-shift-based precoding scheme according to the present invention.
Figure 8:
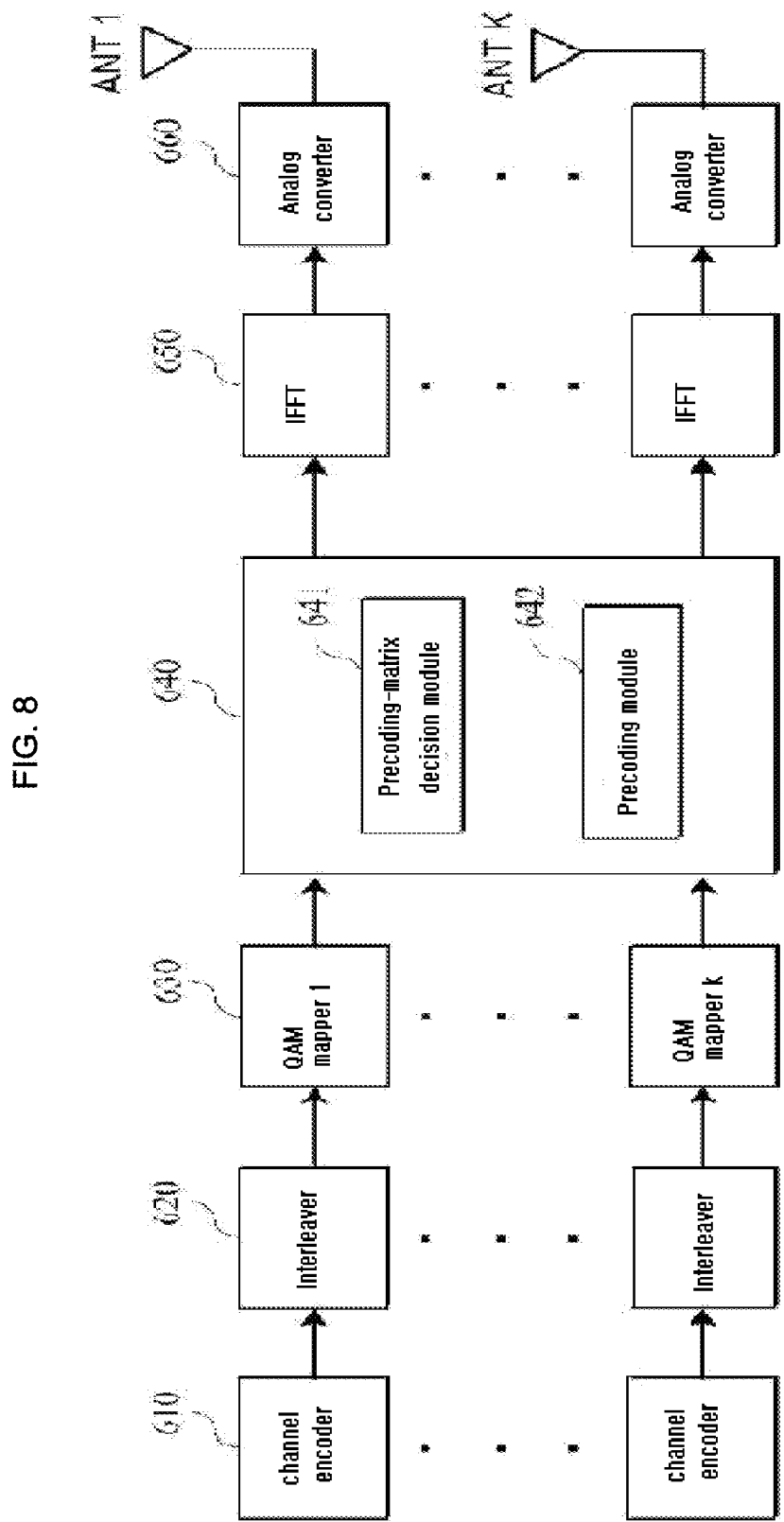
FIG. 8 is a block diagram illustrating a MCW OFDM transmitter according to the present invention.

FIG. 7 is a block diagram illustrating a SCW OFDM transmitter based on a phase-shift-based precoding scheme according to the present invention. FIG. 8 is a block diagram illustrating a MCW OFDM transmitter according to the present invention.

Figure 1:
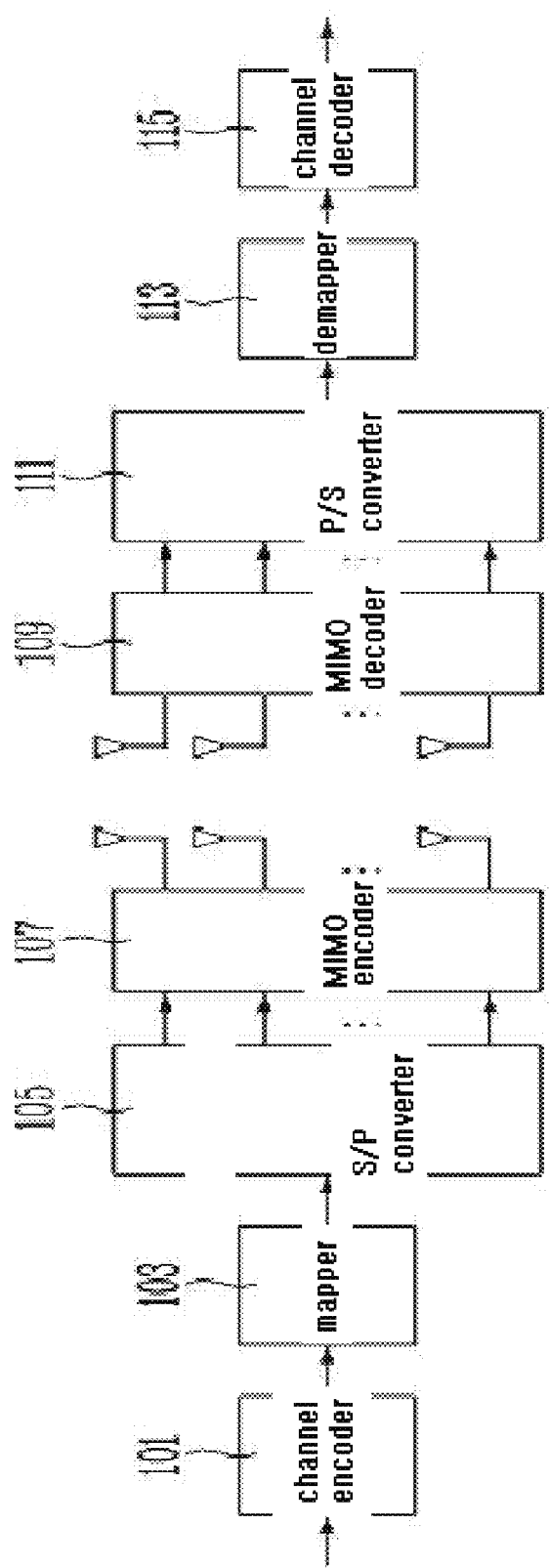
FIG. 1 is a block diagram illustrating an OFDM system equipped with multiple transmission/reception (Tx/Rx) antennas.
Figure 2:
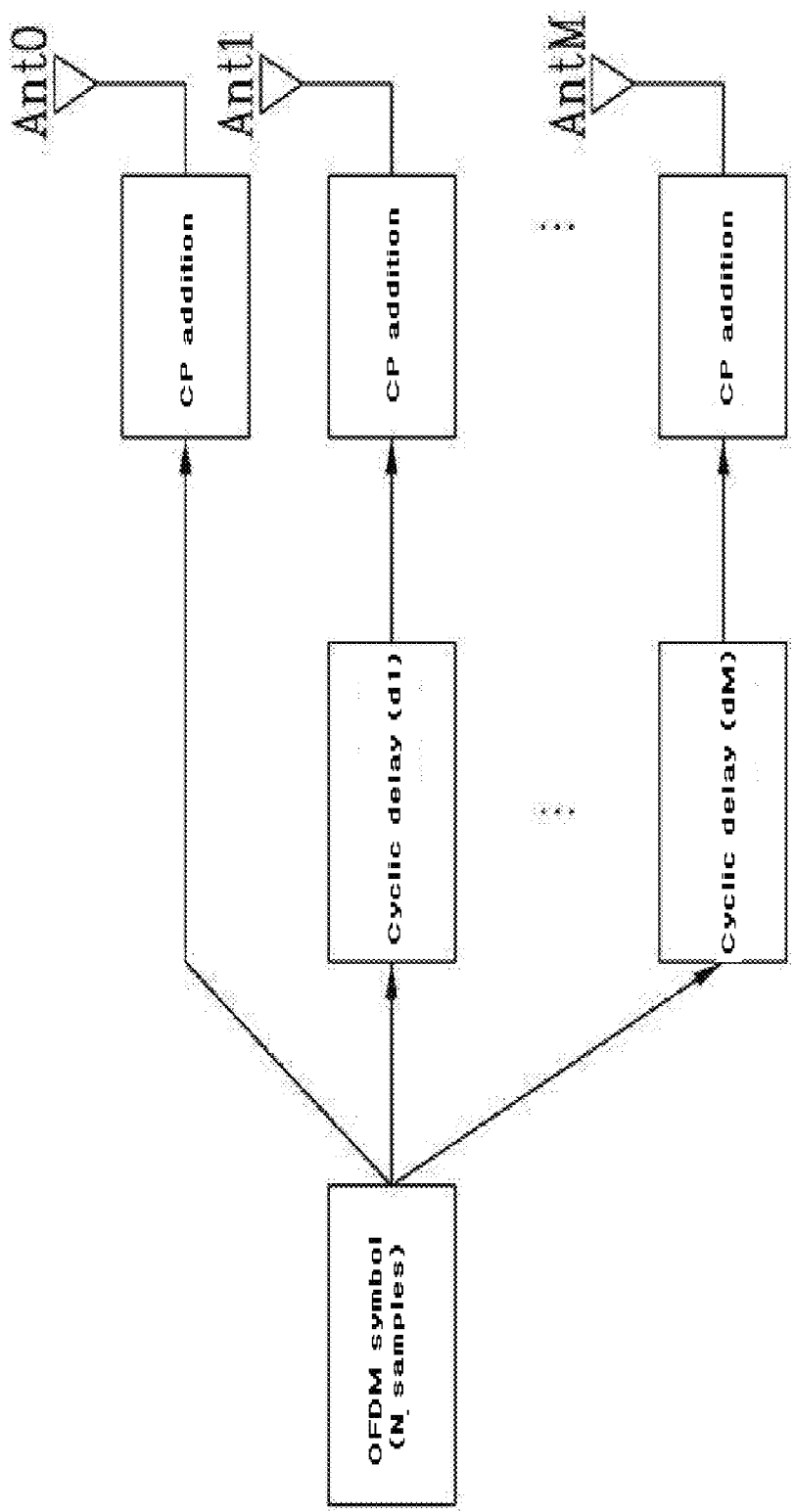
FIG. 2 is a block diagram illustrating a transmission end of a MIMO system based on a conventional Cyclic Delay Diversity (CDD) scheme.
Figure 3:
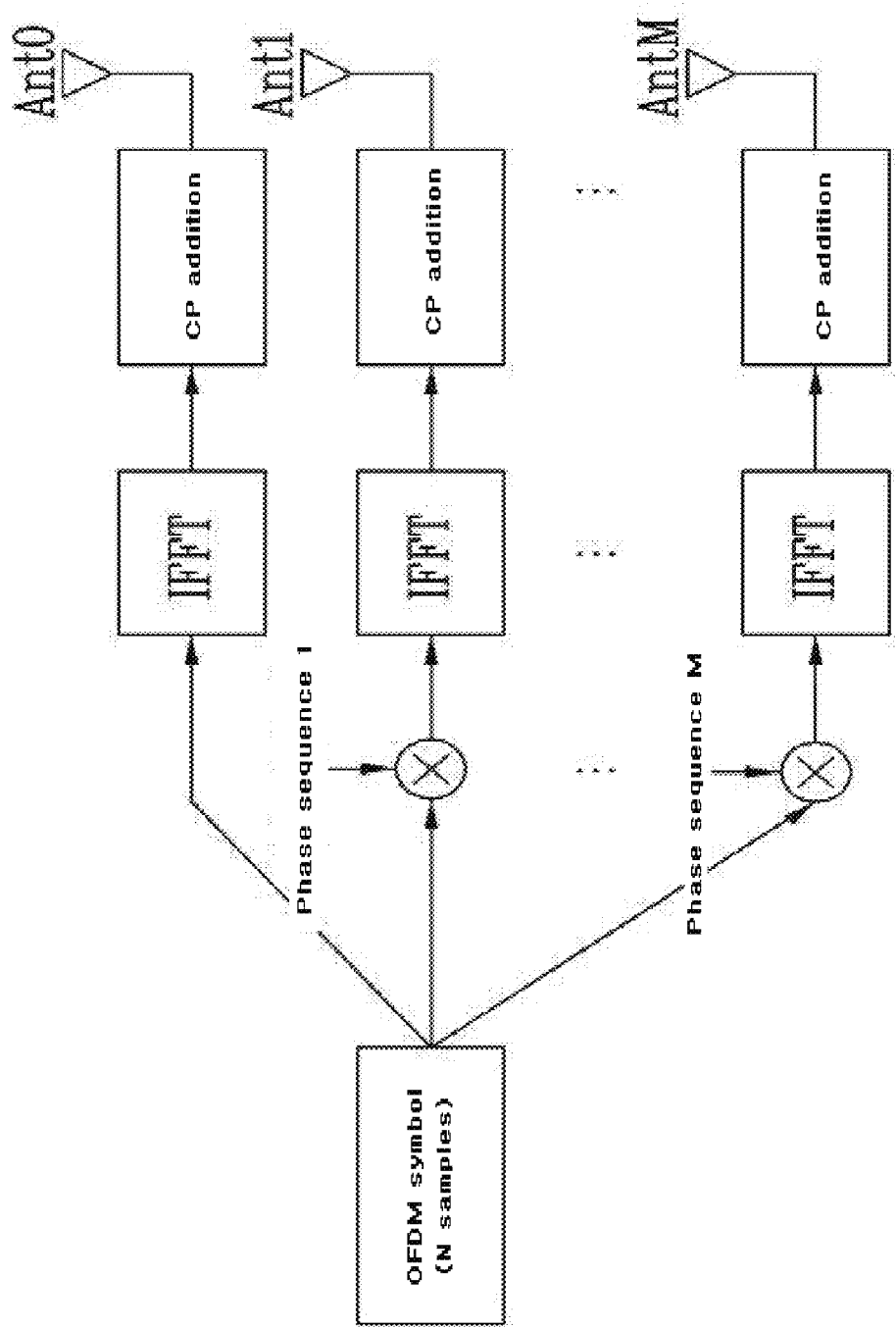
FIG. 3 is a block diagram illustrating a transmission end of a MIMO system based on a conventional phase shift diversity (PSD) scheme.
Figure 4:
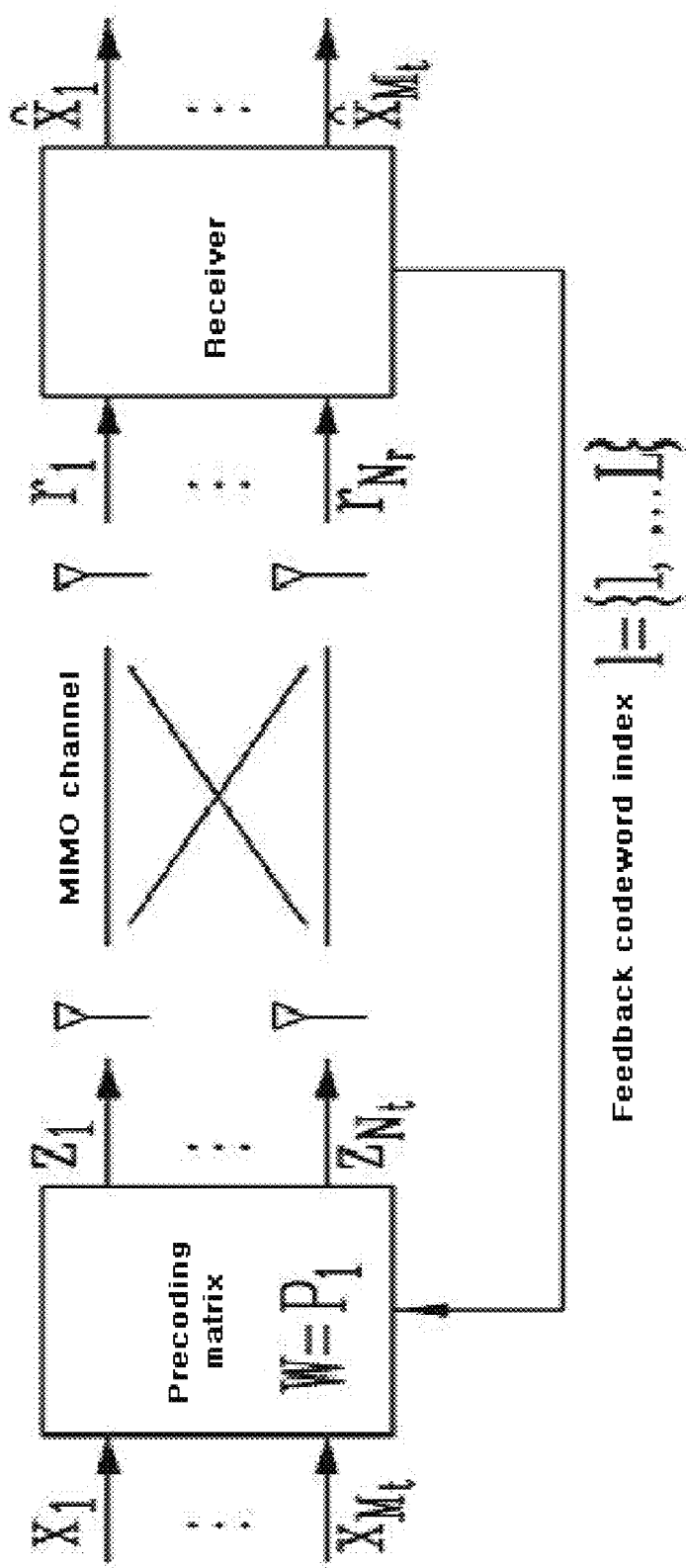
FIG. 4 is a block diagram illustrating a transceiver of a MIMO system based on a conventional precoding scheme.

Referring to FIGS. 7 and 8, channel encoders 510 and 610, interleavers 520 and 620, IFFT (Inverse Fast Fourier Transform) units 550 and 650, and analog converters 560 and 660 and so forth are equal to those of FIG. 1, so that their detailed description will herein be omitted for the convenience of description. Only precoders 540 and 640 will hereinafter be described in detail.

The precoder 540 includes a precoding-matrix decision module 541 and a precoding module 542. The precoder 640 includes a precoding-matrix decision module 641 and a precoding module 642.

The precoding-matrix decision module (541,641) is configured in the form of a first group of equations 12, 14, and 15 or a second group of equations 20 and 21, and determines a phase-shift-based precoding matrix. A detailed method for determining the precoding matrix has already been described in the second to fourth embodiments, so that a detailed description thereof will herein be omitted for the convenience of description. The phase-shift-based precoding matrix based on either the first group of equations 12, 14, and 15 or the second group of equations 20 and 21 may change a precoding matrix for preventing an interference between sub-carriers, a phase angle of a diagonal matrix, and/or a unitary matrix in time, as shown in Equation 18.

The precoding-matrix decision module (541,641) may select at least one of the precoding matrix and the unitary matrix on the basis of feedback information of a reception end. In this case, it is preferable that the feedback information may include a matrix index of a predetermined codebook.

The precoding module (542,642) multiplies an OFDM symbol by the determined phase-shift-based precoding matrix, and performs precoding on the multiplied result.

Generally, individual components of a receiver have functions opposite to those of the transmitter. The receiver in a MIMO-OFDM system using a phase-shift-based precoding matrix will be described.

First, the receiver receives pilot signal from the transmitter and achieves MIMO channel information using the received pilot signal. And then, the receiver achieves equivalent MIMO channel information by multiplying a phase-shift-based precoding matrix by the achieved MIMO channel information. The phase-shift-based precoding can be determined based on at least one of spatial multiplexing rate (or rank) information and precoding matrix information from the transmitter.

The receiver can extract data signal using the equivalent MIMO channel information and signal vector received from the transmitter. And channel decoding is performed to the extracted data signal for error detection/correction then, finally data transmitted by the transmitter can be achieved. According to MIMO reception scheme, pre-described operations can be used iteratively or additional decoding operations can be comprised further.

The receiver based on a phase-shift-based precoding scheme according to the present invention may be adapted without modification in conformity with the MIMO reception scheme, thereby, further details on the MIMO reception scheme are abridged.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention provides a phase-shift-based precoding scheme for solving the problems of conventional CDD, PSD, and precoding methods, resulting in the implementation of effective communication. Specifically, the phase-shift-based precoding scheme is generalized or extended, the design of a transceiver is simplified or the communication efficiency increases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting data from a transmission end device to a reception end device in a Multi-Input Multi-Output (MIMO) system using a plurality of sub-carriers, the method comprising:
   determining a precoding matrix as a first part of a phase-shift-based precoding matrix;
   determining a first diagonal matrix for a phase shift as a second part of the phase-shift-based precoding matrix;
   determining a unitary matrix as a third part of the phase-shift-based precoding matrix; and
   precoding by multiplying the phase-shift-based precoding matrix by a transmission symbol according to a resource,
   wherein the phase-shift-based precoding matrix is determined by multiplying the precoding matrix, the first diagonal matrix, and the unitary matrix, and wherein the precoding matrix is selected from only a portion of the precoding matrixes included in a first codebook predetermined between the transmission end device and the reception end device.

2. The method according to claim 1, wherein the precoding matrix is selected from a second codebook which constitutes the portion of the first codebook from which the precoding matrix is selected.

3. The method according to claim 2, wherein the precoding matrix is cyclically selected from the second codebook with a predetermined repetition period with respect to a resource index (k).

4. The method according to claim 3, wherein the precoding matrix is selected from the second codebook according to an index acquired by (k mod N), wherein (k mod N) is a modulo operation of the resource index (k) based on a number (N) of precoding matrixes included in the second codebook.

5. The method according to claim 1, wherein the phase-shift-based precoding matrix is represented by the following equation:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}),$$

wherein ($\mathbb{P}_{N_t \times R}$) is the precoding matrix, $N_t$ is a number of a transmission antenna, ($\mathbb{U}_{R \times R}$) is the unitary matrix, "k" is a resource index, $\theta_i$ is a phase angle value, and R is a spatial multiplexing rate.

6. The method according to claim 1, wherein the precoding matrix is selected from the portion of the first codebook without using feedback information received from the reception end device.

7. A transceiver for transmitting data in a Multi-Input Multi-Output (MIMO) system using a plurality of sub-carriers, the transceiver comprising:
   a precoding-matrix decision module for determining a precoding matrix as a first part of a phase-shift-based precoding matrix, determining a first diagonal matrix for a phase shift as a second part of the phase-shift-based precoding matrix, determining a unitary matrix as a third part of the phase-shift-based precoding matrix, and determining the phase-shift-based precoding matrix by multiplying the precoding matrix, the first diagonal matrix, and the unitary matrix; and
   a precoding module for precoding by multiplying the phase-shift-based precoding matrix by a transmission symbol according to a resource,
   wherein the precoding-matrix decision module selects the precoding matrix from only a portion of the precoding matrixes included in a first codebook predetermined between a transmission end device and a reception end device.

8. The transceiver according to claim 7, wherein the precoding-matrix decision module selects the precoding matrix from a second codebook which constitutes the portion of the first codebook from which the precoding matrix is selected.

9. The transceiver according to claim 8, wherein the precoding-matrix decision module cyclically selects the precoding matrix from the second codebook with a predetermined repetition period with respect to a resource index (k).

10. The transceiver according to claim 9, wherein the precoding-matrix decision module selects the precoding matrix from the second codebook according to an index acquired by (k mod N), wherein (k mod N) is a modulo operation of the resource index (k) based on a number (N) of precoding matrixes included in the second codebook.

11. The transceiver according to claim 7, wherein the phase-shift-based precoding matrix is represented by the following equation:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}),$$

wherein ($\mathbb{P}_{N_t \times R}$) is the precoding matrix, $N_t$ is a number of a transmission antenna, ($\mathbb{U}_{R \times R}$) is the unitary matrix, "k" is a resource index, $\theta_i$ is a phase angle value, and R is a spatial multiplexing rate.

12. The transceiver according to claim 7, wherein the precoding matrix decision module selects the precoding matrix from the portion of the first codebook without using feedback information received from the reception end device.

13. A method for a reception end device receiving a data from a transmission end device in a Multi-Input Multi-Output (MIMO) system using a plurality of sub-carriers, the method comprising:
   determining a precoding matrix as a first part of a phase-shift-based precoding matrix;
   determining a first diagonal matrix for a phase shift as a second part of the phase-shift-based precoding matrix;
   determining a unitary matrix as a third part of the phase-shift-based precoding matrix; and
   decoding a transmission symbol according to a resource based on the phase-shift-based precoding matrix,
   wherein the phase-shift-based precoding matrix is determined by multiplying the precoding matrix, the first diagonal matrix, and the unitary matrix, and
   wherein the precoding matrix is selected from only a portion of the precoding matrixes included in a first codebook predetermined between the transmission end device and the reception end device.

14. The method according to claim 13, wherein the precoding matrix is selected from a second codebook which constitutes the portion of the first codebook from which the precoding matrix is selected.

15. The method according to claim 14, wherein the precoding matrix is cyclically selected from the second codebook with a predetermined repetition period with respect to a resource index (k).

* * * * *